(12) United States Patent
Keyzer

(10) Patent No.: US 11,133,627 B2
(45) Date of Patent: Sep. 28, 2021

(54) POWER DISTRIBUTION SYSTEM

(71) Applicant: HERMAN MILLER, INC., Zeeland, MI (US)

(72) Inventor: Peter J. Keyzer, Caledonia, MI (US)

(73) Assignee: HERMAN MILLER, INC., Zeeland, MI (US)

(*) Notice: Subject to any disclaimer, the term of this patent is extended or adjusted under 35 U.S.C. 154(b) by 0 days.

(21) Appl. No.: 16/673,429

(22) Filed: Nov. 4, 2019

(65) Prior Publication Data
US 2020/0153177 A1     May 14, 2020

Related U.S. Application Data

(60) Provisional application No. 62/757,877, filed on Nov. 9, 2018.

(51) Int. Cl.
*H01R 24/78* (2011.01)
*H01R 25/00* (2006.01)
(Continued)

(52) U.S. Cl.
CPC ......... *H01R 25/003* (2013.01); *H01R 13/516* (2013.01); *H01R 24/78* (2013.01);
(Continued)

(58) Field of Classification Search
CPC ............... H01R 24/64; H01R 2107/00; H01R 13/6469; H01R 13/6466; H01R 13/6461;
(Continued)

(56) References Cited

U.S. PATENT DOCUMENTS 3,860,739 A * 1/1975 Kloth .................... H01R 24/76
174/503
4,085,988 A     4/1978 Gamble
(Continued)

OTHER PUBLICATIONS

Powerpole, "Wire to Board", Website: https://www.andersonpower.com/shop/wire-to-board/powerpole.html, webpage accessed Feb. 25, 2020.

(Continued)

*Primary Examiner* — Truc T Nguyen
(74) *Attorney, Agent, or Firm* — Michael Best & Friedrich LLP

(57) ABSTRACT

A power distribution system includes a plurality of wires extending between a first end and a second end. The wires extend continuously between the first and second ends, Each wire includes an electrical conductor and an insulation layer. The power distribution system further includes a receptacle selectively positionable at any position along a length of the wires. The power receptacle includes a housing defining at least one power outlet. A plurality of connection members is positioned within the housing. Each connection member includes a first end and a second end. The first end is configured to contact the electrical conductors within the insulation layers of the plurality of wires for electrically connecting the plurality of connection members to the plurality of wires. The second end is configured to electrically connect the plurality of connection members to the at least one power outlet.

20 Claims, 12 Drawing Sheets

(51) Int. Cl.
*H01R 24/84* (2011.01)
*H01R 13/516* (2006.01)
*H02J 3/00* (2006.01)
*H01R 31/02* (2006.01)

(52) U.S. Cl.
CPC .......... *H01R 24/84* (2013.01); *H01R 25/006* (2013.01); *H01R 31/02* (2013.01); *H02J 3/00* (2013.01)

(58) Field of Classification Search
CPC .. H01R 4/2433; H01R 13/6272; H01R 24/00; H01R 13/6467
See application file for complete search history.

(56) References Cited

U.S. PATENT DOCUMENTS

| | | | |
|---|---|---|---|
| 4,479,692 A | 10/1984 | Greenwood et al. | |
| 4,546,542 A * | 10/1985 | Proud | H01R 43/16 |
| | | | 29/874 |
| 4,717,357 A | 1/1988 | Greenwood | |
| 5,203,711 A * | 4/1993 | Bogiel | H01R 25/162 |
| | | | 439/215 |
| 5,277,609 A | 1/1994 | Ondrejka | |
| 5,501,605 A | 3/1996 | Ozaki et al. | |
| 6,325,650 B1 | 12/2001 | Wilson et al. | |
| 6,487,091 B2 | 11/2002 | Malkowski, Jr. et al. | |
| 6,620,874 B1 | 9/2003 | Young et al. | |
| 6,663,435 B2 | 12/2003 | Lincoln, III et al. | |
| 6,666,712 B1 | 12/2003 | Kramer | |
| 6,677,689 B2 | 1/2004 | Marihugh et al. | |
| 6,795,320 B2 | 9/2004 | Malkowski, Jr. et al. | |
| 6,805,567 B2 | 10/2004 | Chapman et al. | |
| 7,052,299 B2 | 5/2006 | Kim et al. | |
| 7,114,972 B1 | 10/2006 | Riner | |
| 7,165,863 B1 | 1/2007 | Thomas et al. | |
| 7,198,526 B1 * | 4/2007 | MacNeil | H01R 4/185 |
| | | | 439/881 |
| 7,201,589 B2 | 4/2007 | Jong | |
| 7,826,202 B2 | 11/2010 | Johnson et al. | |
| 7,891,993 B2 | 2/2011 | Huber et al. | |
| 8,029,307 B2 | 10/2011 | O'Rourke | |
| 8,033,867 B1 | 10/2011 | Kessler et al. | |
| 8,480,415 B2 | 7/2013 | Byrne | |
| 8,736,106 B2 | 5/2014 | Byrne et al. | |
| 9,231,358 B1 | 1/2016 | Schow et al. | |
| 9,325,130 B2 | 4/2016 | Lombardo | |
| 9,653,894 B2 | 5/2017 | Kitamura et al. | |
| 9,692,195 B2 | 6/2017 | Mittelstadt et al. | |
| 9,722,372 B2 | 8/2017 | Byrne | |
| 2004/0203278 A1 | 10/2004 | Lin et al. | |
| 2006/0035511 A1 * | 2/2006 | Mrakovich | H01R 25/147 |
| | | | 439/404 |
| 2006/0035512 A1 * | 2/2006 | Gerberding | H01R 12/675 |
| | | | 439/411 |
| 2006/0197474 A1 | 9/2006 | Olsen | |
| 2009/0163074 A1 * | 6/2009 | Arflack | H02G 3/128 |
| | | | 439/535 |
| 2009/0258533 A1 * | 10/2009 | Dennes | H01R 4/2433 |
| | | | 439/395 |
| 2010/0099303 A1 * | 4/2010 | Maenhout | H01R 13/7033 |
| | | | 439/625 |
| 2010/0197161 A1 * | 8/2010 | Dennes | H01R 4/2433 |
| | | | 439/404 |
| 2014/0204544 A1 | 7/2014 | Tanaka et al. | |
| 2016/0344111 A1 * | 11/2016 | Lucantonio | H01R 4/2412 |
| 2017/0082903 A1 | 3/2017 | Vigano et al. | |

OTHER PUBLICATIONS

TE connectivity, "AMP:208979-2 Panel & PCB Outlets", Website: https://www.te.com/usa-en/product-208979-2.html?q=208979&source=header, webpage accessed Feb. 25, 2020.

* cited by examiner

POWER DISTRIBUTION SYSTEM

CROSS-REFERENCE TO RELATED APPLICATIONS

This application claims priority to U.S. Provisional Patent Application No. 62/757,877, filed Nov. 9, 2018, the entire contents of which are incorporated by reference herein.

FIELD OF THE INVENTION

The present invention relates to a power distribution system, and more particularly to a power distribution system operable to provide power at any position and orientation along the system.

SUMMARY

In one embodiment, the invention provides a power distribution system including a plurality of wires extending between a first end and a second end. The wires extend continuously between the first and second ends. Each wire includes an electrical conductor and an insulation layer. The power distribution system further includes a receptacle selectively positionable at any position along a length of the wires. The power receptacle includes a housing defining at least one power outlet. A plurality of connection members is positioned within the housing. Each connection member includes a first end and a second end. The first end is configured to contact the electrical conductors within the insulation layers of the plurality of wires for electrically connecting the plurality of connection members to the plurality of wires. The second end is configured to electrically connect the plurality of connection members to the at least one power outlet.

In another embodiment, the invention provides a power receptacle including a housing having a first side and a second side opposite the first side. The housing defines a power outlet on the first side, a first hole on the second side, and a second hole on the second side. The power receptacle further includes a wall member positioned within the power receptacle to separate an interior of the housing into a first chamber portion and a second chamber portion. The first chamber portion has the first hole, and the second chamber portion has the second hole. The power receptacle further includes a first connection member received in the first chamber portion and electrically coupled to the power outlet, and a second connection member received in the second chamber portion and electrically coupled to the power outlet. The power receptacle includes a rib extending outwardly from the second side of the housing. The rib is positioned between the first hole and the second hole to inhibit a fluid path from forming between the first hole and the second hole.

In yet another embodiment, the invention provides a power distribution system including a plurality of wires extending between a first end and a second end. The wires extend continuously between the first and second ends. Each wire includes an electrical conductor and an insulation layer. A receptacle is selectively positionable at any position along a length of the wires. The power receptacle includes a housing having a first side and a second side opposite the first side. The housing defines a power outlet on the first side, a first hole on the second side, and a second hole on the second side. A wall member is positioned within the receptacle to separate an interior of the housing into a first chamber portion and a second chamber portion. The first chamber portion has the first hole, and the second chamber portion has the second hole. A first connection member is received in the first chamber portion and electrically coupled to the power outlet. A second connection member is received in the second chamber portion and electrically coupled to the power outlet. A rib extends outwardly from the second side of the housing. The rib is positioned between the first hole and the second hole to inhibit a fluid path from forming between the first hole and the second hole. The power distribution system further includes a plurality of connection members positioned within the housing. Each connection member includes a first end and a second end. The first end is configured to contact the electrical conductors within the insulation layers of the plurality of wires for electrically connecting the plurality of connection members to the plurality of wires. The second end is configured to electrically connect the plurality of connection members to the power outlet.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
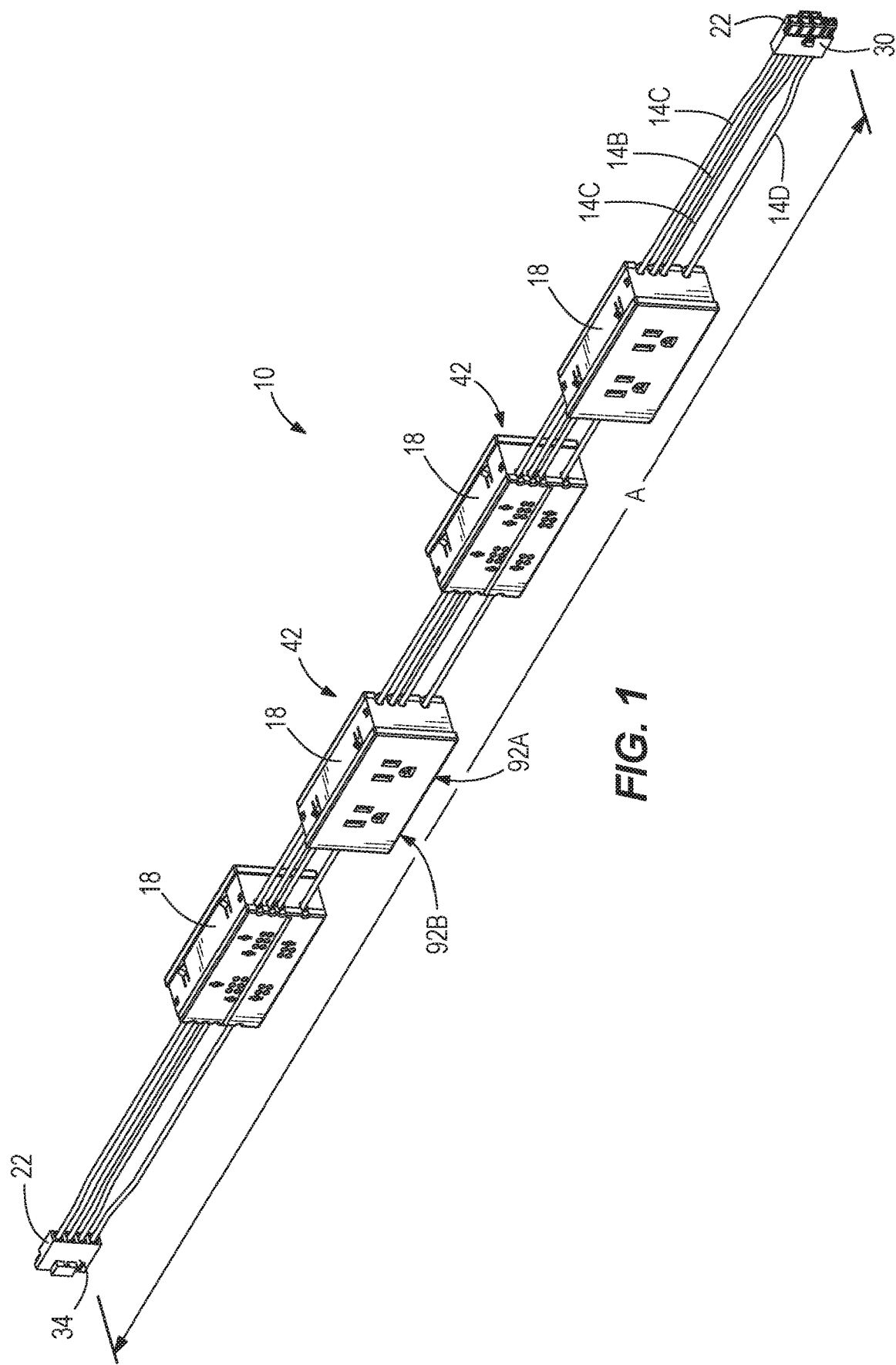
FIG. 1 is a perspective view of a power distribution system embodying the invention, the power distribution system including a plurality of power receptacles and a plurality of wires.
Figure 14:
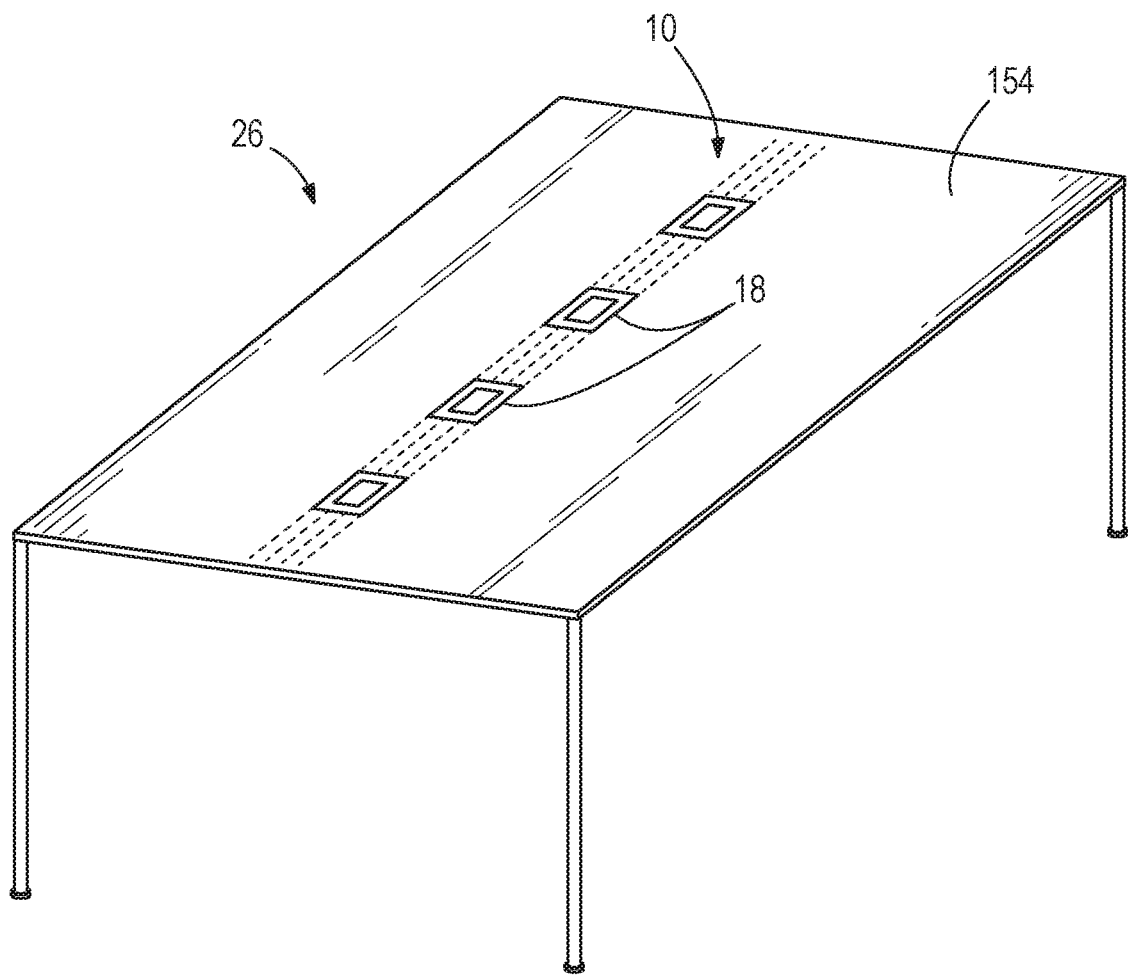
FIG. 14 is a perspective view of a table configured to support the power distribution system of FIG. 1.

FIG. 1 illustrates a power distribution system 10. The power distribution system 10 includes a plurality of wires 14A-14D, a plurality of power receptacles 18, and a plurality of wire connectors 22. The power distribution system 10 is configured to distribute power within a furniture item or system 26 (e.g., table; FIG. 14). Specifically, the power receptacles 18 and the wires 14A-14D are supported by the furniture system 26. In addition, the power receptacles 18 are selectively positionable at any position along a length A of the wires 14A-14D. The power receptacles 18 are selectively positonable at any orientation relative to the wires 14A-14D, to supply power to an end user at any desired location of the furniture system 26.

Figure 2:
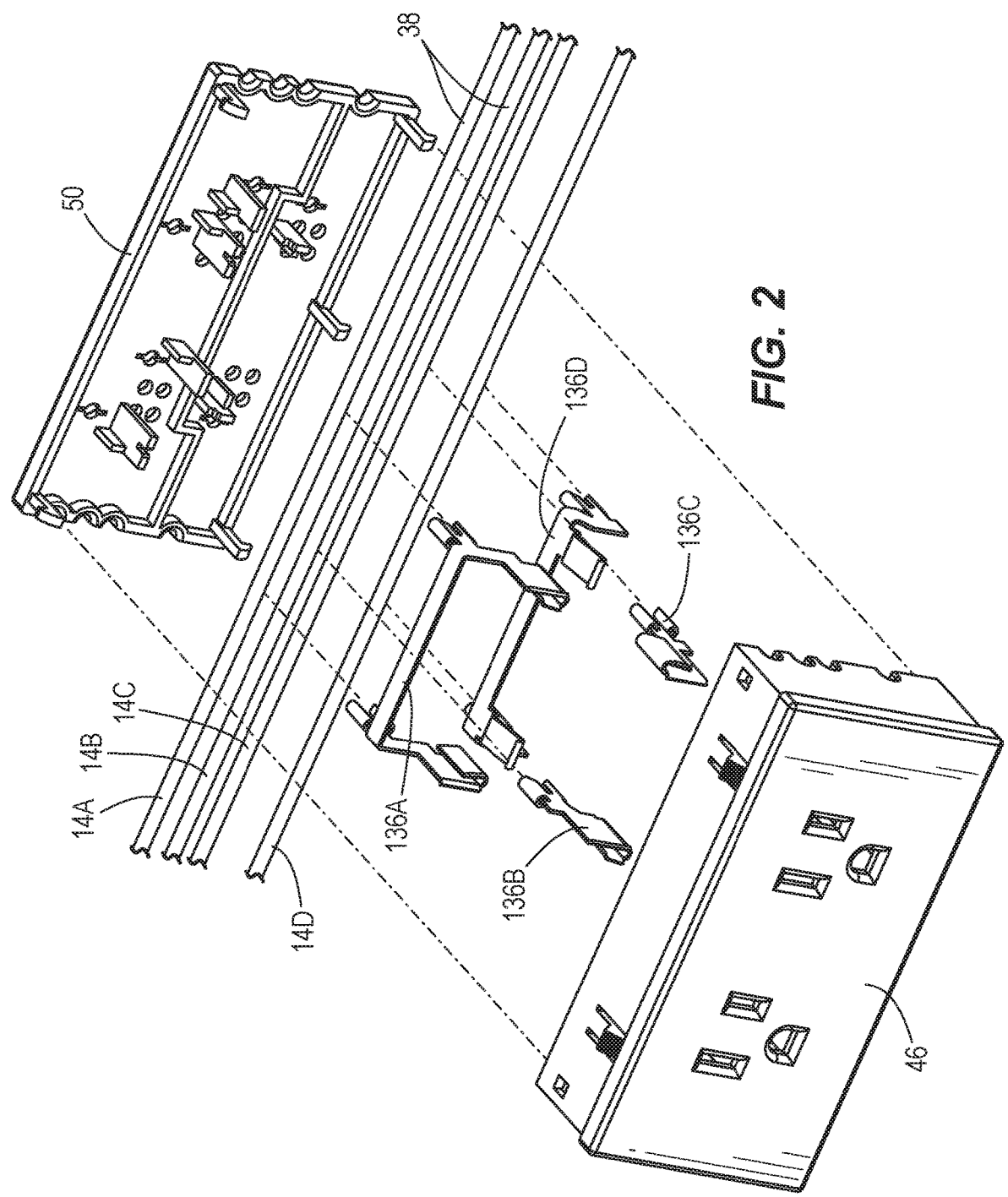
FIG. 2 is an exploded view of one of the power receptacles of FIG. 1, the power receptacle including a first housing portion, a second housing portion, and a plurality of connection members.

With reference to FIGS. 1 and 2, the power distribution system 10 includes the plurality of wires 14A-14D. In the illustrated embodiment, the power distribution system 10 includes four wires 14A-14D. A first wire 14A is a neutral wire of the power distribution system 10, a second wire 14B is a first line of the power distribution system 10, a third wire 14C is a second line of the power distribution system 10, and a fourth wire 14D is a ground of the power distribution system 10. As such, the power distribution system 10 is configured as a four wire system having two circuits. In other embodiments, the power distribution system 10 may not include the third wire 14C such that the power distribution system 10 only provides one circuit. In further embodiments, the power distribution system 10 may include additional wires such that the system 10 provides more than two circuits.

Figure 15C:
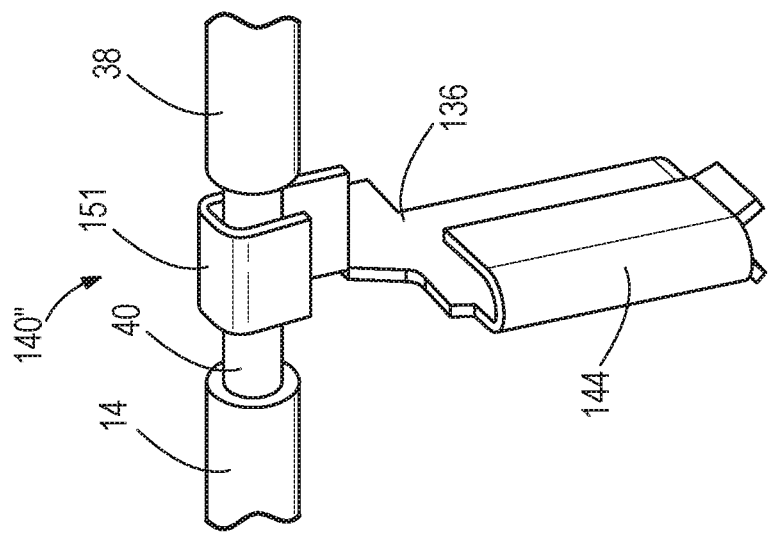
FIG. 15C is another perspective view of the one of the connection members and the wire of FIG. 15B, illustrating the one of the connection members in a second position.
Figure 15B:
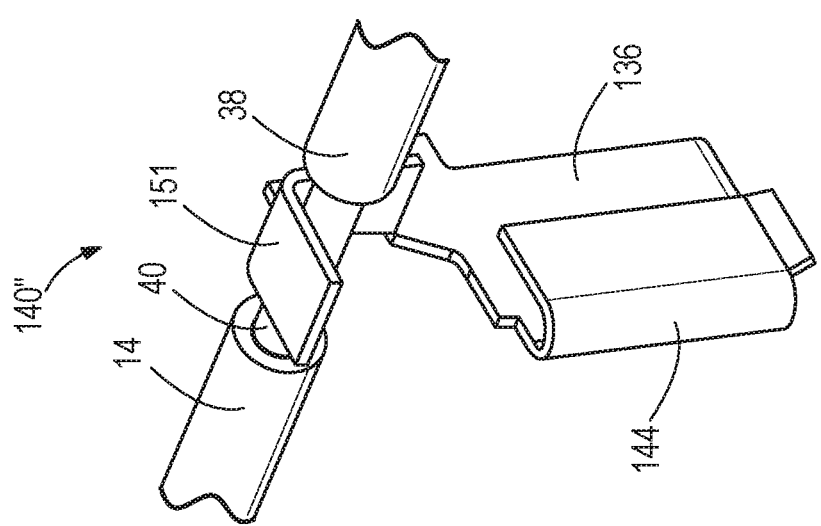
FIG. 15B is a perspective of the one of the connection members of FIG. 15A, and a wire, illustrating the one of the connection members in a first position.
Figure 15A:
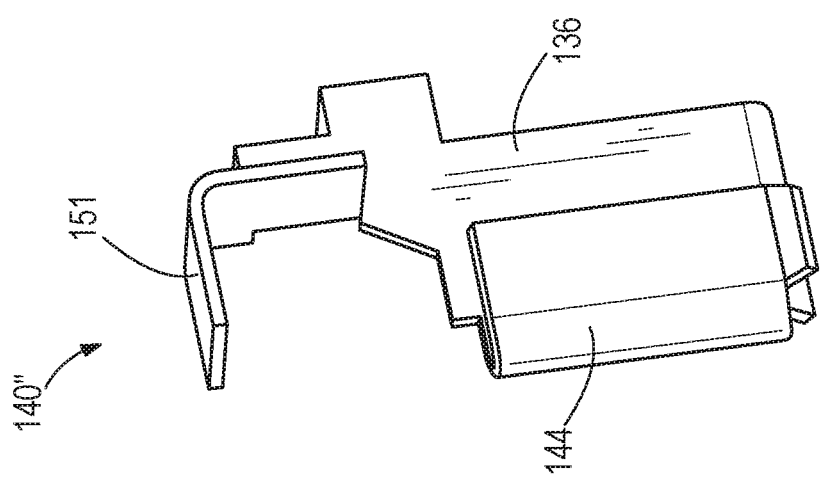
FIG. 15A is a perspective view of an alternative embodiment of one of the connection members of FIG. 12A.

With continued reference to FIGS. 1 and 2, the wires 14A-14D extend between a first end 30 and a second end 34. In particular, the wires 14A-14D extend continuously between the first and second ends 30, 34. The length A of the wire 14A-14D is defined as the distance between the first end 30 and the second end 34. In some embodiments, the length A of the wires 14A-14D may be between about one foot to about ten feet. For example, in one embodiment, the length A is about one foot. In another embodiment, the length A is about three feet. in another embodiment, the length A is about eight feet. Alternatively, the length A is over ten feet. Furthermore, each wire 14A-14D includes an insulation layer 38 (FIG. 2) surrounding an electrical conductor 40 (FIGS. 15A-15C). In other words, the electrical conductor 40 extends through the insulation layer 38 from the first end 30 to the second end 34 of each wire 14A-14D. In the illustrated embodiment, the four electrical conductors 40 are configured to conduct neutral, first line, second line, and ground of the power distribution system 10.

With reference to FIG. 1, the power distribution system 10 includes the wire connectors 22. The wire connectors 22 are positioned at the first and second ends 30, 34 of the wires 14A-14D. The wire connectors 22 are configured to electrically connect the wires 14A-14D to other power distribution systems. For example, the wire connector 22 positioned at the first end 30 may connect the power distribution system 10 to a power distribution system that is hardwired (i.e., relatively permanent connection) to a building's power supply. The wire connector 22 positioned at the second end 34 may connect to another power distribution system such that multiple power distribution systems may be daisy-chained together. Furthermore, the illustrated wire connectors 22 are hermaphroditic (i.e., genderless) for facilitating the connection to the other power distribution systems. That is, each wire connector 22 may be plugged into any other similarly-configured wire connector 22, and the power distribution system 10 does not include dedicated male plugs and female receptacles.

With reference to FIGS. 1-13, the power distribution system 10 includes the plurality of power receptacles 18 couplable to the wires 14A-14D. In the illustrated embodiment, the power distribution system 10 includes four power receptacles 18 positioned between the first and second ends 30, 34 of the wires 14A-14D. In other embodiments, the power distribution system 10 may include one or more power receptacles 18.

Each power receptacle 18 includes a housing 42. The illustrated housing 42 has a generally box-like shape. The housing 42 is formed from a non-conductive material (e.g., plastic). Furthermore, the illustrated housing 42 includes a first housing portion 46 and a second housing portion 50 coupled to the first housing portion 46. The first and second housing portions 46, 50 define a plurality of sides 54A-54F of the housing 42.

With reference to FIGS. 2-7, the illustrated first housing portion 46 includes a first side 54A, a second side 54B, and a front side 54C extending between the first and second sides 54A, 54B. In addition, the illustrated first housing portion 46 includes top and bottom sides 54D, 54E extending between the first and second sides 54A, 54B.

Figure 9:
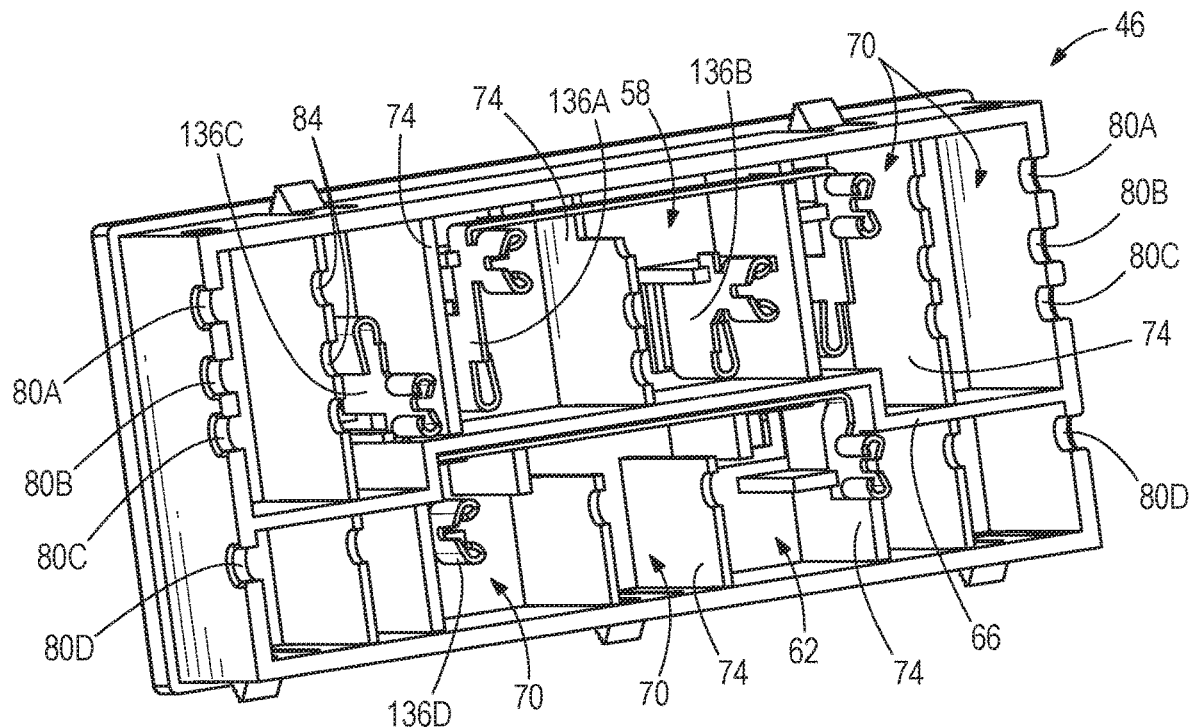
FIG. 9 is a rear view of the first housing portion including the plurality of connection members of FIG. 2.
Figure 10:
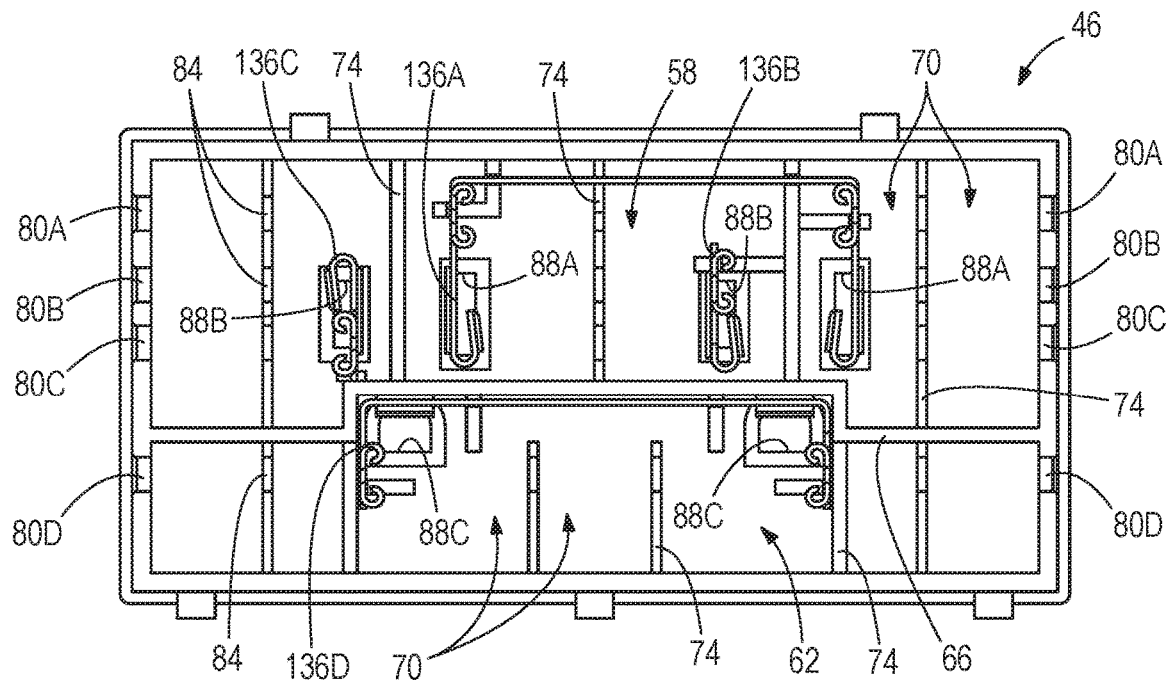
FIG. 10 is a rear view of the first housing portion including the plurality of connection members of FIG. 9.

With particular reference to FIGS. 9-10, the sides 54A-54E of the first housing portion 46 form a plurality of chambers 58, 62 of the housing 42. In the illustrated embodiment, the first housing portion 46 includes a first chamber 58 and a second chamber 62. The first and second chambers 58, 62 are separated by a wall member 66, or rib, extending from an inner surface of the front side 54C, and extending between the first and second sides 54A, 54B. Furthermore, the wall member 66 is generally parallel to the top and bottom sides 54D, 54E such that the first and second chambers 58, 62 have a substantially longitudinal shape. The first chamber 58 and the second chamber 62 may be separated into smaller chambers 70. For example, the first chamber 58 includes five secondary wall members 74 extending between the wall member 66 and the top side 54D to form six small chambers 70. The first chamber 58 is configured to receive the neutral, the first line, and the second line wires 14A-14C. More specifically, one of the smaller chambers 70 of the first chamber 58 is configured to receive the first line wire 14B, and another one of the smaller chambers 70 of the first chamber 58 is configured to receive the second line wire 14C. As such, the first line wire 14B and the second line wire 14C may be physically isolated from each other, as well as, the neutral wire 14A, in the first chamber 58. The second chamber 62 is configured to receive the ground wire 14D such that the ground wire 14D is physically isolated from the other wires 14A-14C within the housing 42.

In other embodiments, the housing 42 may include one or more wall members 66 to form a plurality of chambers 58, 66 of the housing 42. For example, the housing 42 may include two wall members 66 to define the first chamber 58, the second chamber 66 and a third chamber. The first chamber 58 is configured to receive the neutral wire 14A, the second chamber 66 is configured to receive the ground wire 14D, and the third chamber is configured to receive the first line wire 14B. As such, the wall members 66 are configured to separate the wires 14A, 14B, 14D from each other such that the wires 14A, 14B, 14D are physically isolated from each other.

Figure 11:
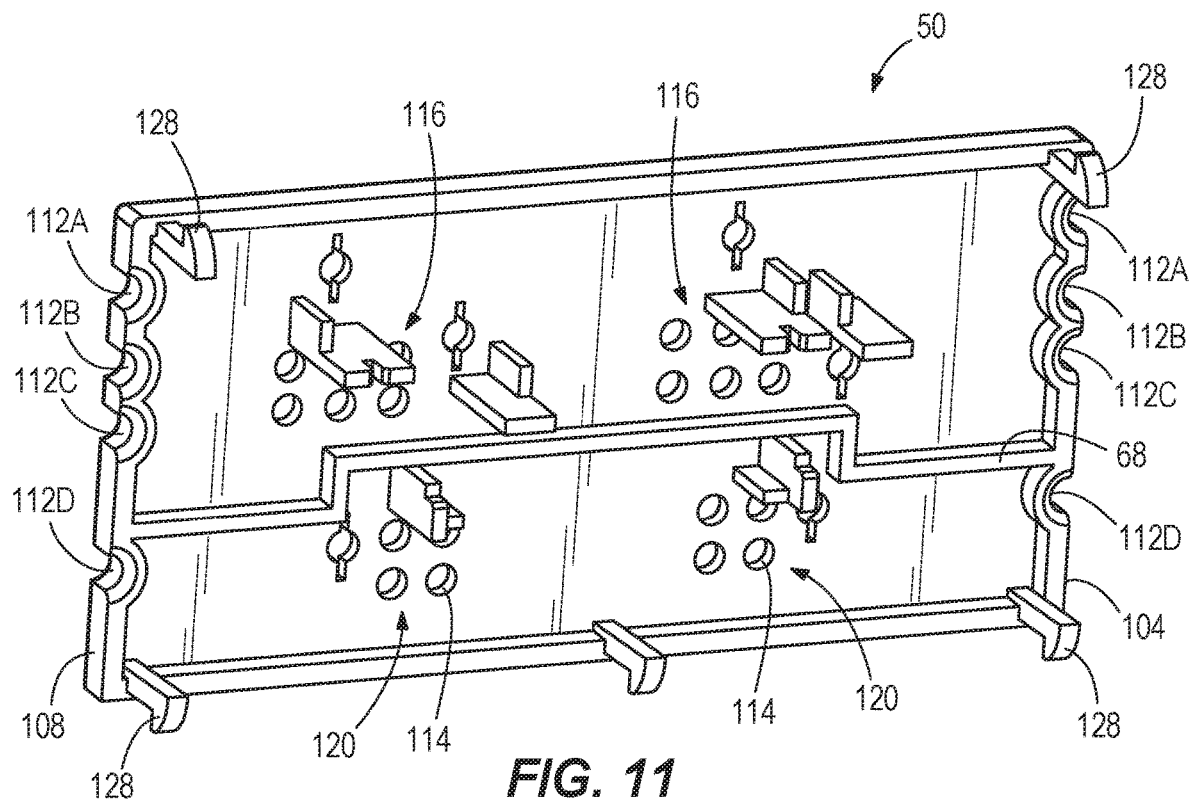
FIG. 11 is a front perspective view of the second housing portion of FIG. 2.

With reference to FIG. 11, the second housing portion 50 also has a wall member 68, or rib. The wall member 68 extends from an inner surface of the second housing portion 50. The wall member 68 corresponds to the wall member 66 of the first housing portion 46 such that when the first and second housing portions 46, 50 are coupled together, the wall member 68 aligns with the wall member 66. As such, the wall member 68 may be configured to further define the first chamber 58 and the second chamber 62. The wall members 66, 68, collectively, are configured to inhibit a liquid flow path forming between the first and second chambers 58, 62.

With reference to FIGS. 2, 3, 5-7, and 9-10, the first and second sides 54A, 54B define a plurality of openings 80A-80D. In the illustrated embodiment, each of the first and second sides 54A, 54B includes four openings 80A-80D. In particular, a first, a second, and a third opening 80A-80C of the openings 80A-80D are positioned on one side of the wall member 66 (FIG. 9), and a fourth opening 80D is positioned on the other side of the wall member 66. In addition, the secondary wall members 74 may also define openings 84 (FIG. 9) corresponding to the openings 80A-80D of the first and second sides 54A, 54B. The openings 80A-80D, 84 are configured to receive the wires 14A-14D. In the illustrated embodiment, the neutral wire 14A is received within the first opening 80A. The first line wire 14B is received in the second opening 80B. The second line wire 14C is received in the third opening 80C. The ground wire 14D is received in the fourth opening 80D. As such, the wires 14A-14D are configured to extend from the first side 54A, through one of the first and second chambers 58, 62, to the second side 54B of the housing 42.

Figure 3:
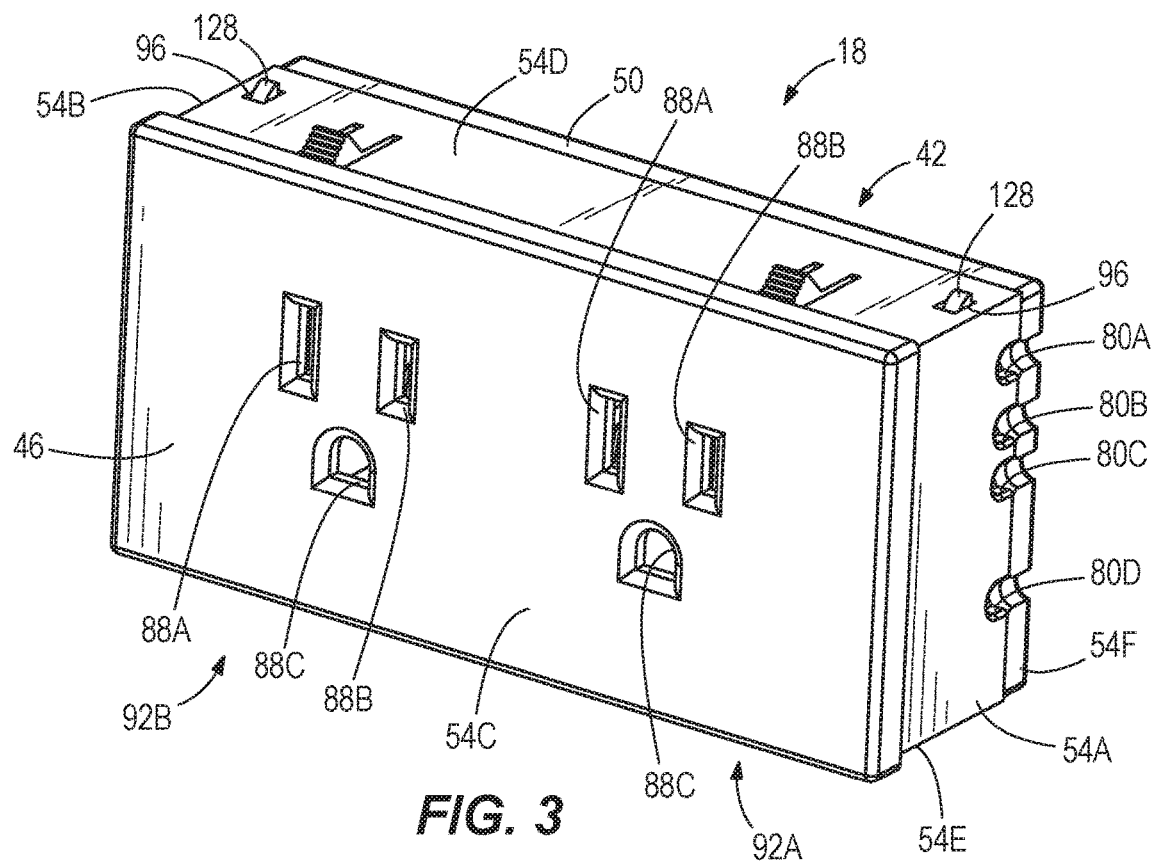
FIG. 3 is a front perspective view of one of the power receptacles of FIG. 1.
Figure 4:
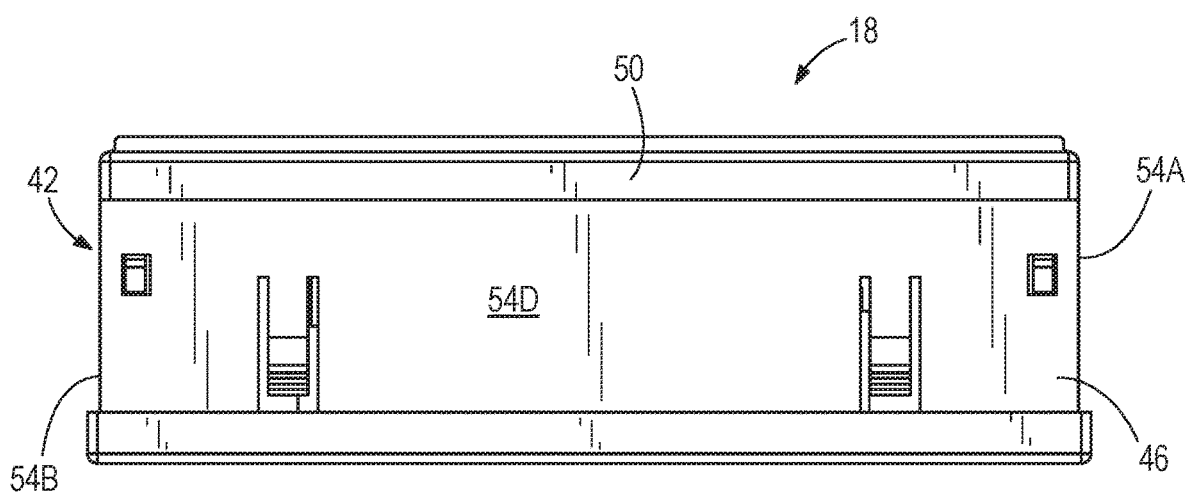
FIG. 4 is a top view of the power receptacle of FIG. 3.
Figure 7:
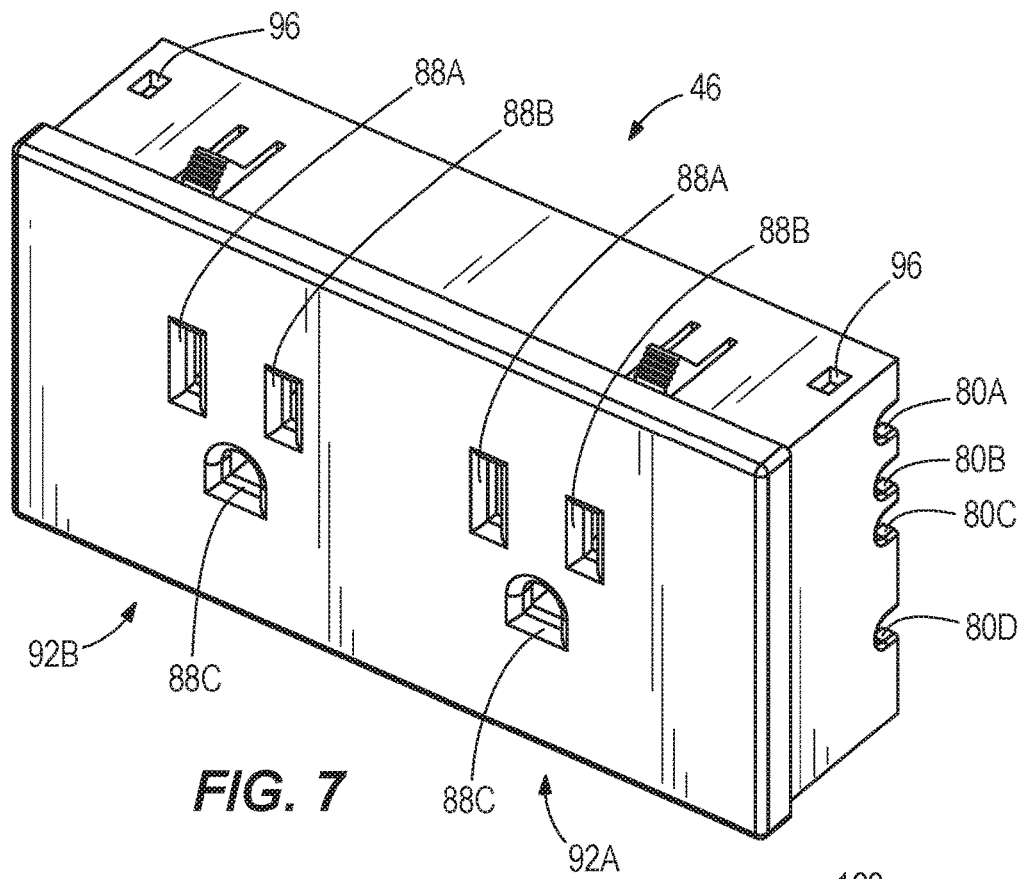
FIG. 7 is a front perspective view the first housing portion of FIG. 2.

With reference to FIGS. 2, 3, and 7, the front side 54C includes a plurality of apertures 88A-88C. The plurality of apertures 88A-88C defines a plurality of power outlets 92A, of the power receptacle 18. In the illustrated embodiment, each power receptacle 18 includes two power outlets 92A, 92B, in which each power outlet 92A, 92B has apertures 88A-88C for supporting neutral, line, and ground of the power distribution system 10. For example, a first aperture 88A is the neutral aperture, a second aperture 88B is the line aperture, and a third aperture 88C is the ground aperture of the power outlet 92A, 92B. In other embodiments, the power receptacle 18 may include one or more power outlets 92A, 92B.

With reference to FIGS. 2-7, the top and bottom sides 54D, 54E of the first housing portion 46 define a plurality of holes 96. The illustrated holes 96 are positioned proximate the first and second sides 54A, 54B. The first housing portion 46 includes four holes 96 (only two of which are shown in FIG. 3). in other embodiments, the power receptacle 18 may include one or more holes 96 positioned on each of the top and bottom sides 54D, 54E.

With reference to FIGS. 2-6 and 8, the second housing portion 50 includes a surface 100 extending between ends 104, 108 of the second housing portion 50. In particular, the second housing portion 50 defines a back side 54F of the housing 42. The back side 54F is spaced from the front side 54C by the first and second sides 54A, 54B when the first and second housing portions 46, 50 are coupled together. In addition, the illustrated back side 54F is parallel to the front side 54C.

Each end 104, 108 of the second housing portion 50 defines a plurality of grooves 112A-112D corresponding to the openings 80A-80D of the first and second sides 54A, 54B. As such, in the illustrated embodiment, each end 104, 108 includes four grooves 112A-112D corresponding to the four openings 80A-80D that receive the neutral, first line, second line, and ground wires 14A-14D. Therefore, when the first and second housing portions 46, 50 are coupled together, the grooves 112A-112D align with the respective openings 80A-80D. In addition, the second housing portion 50 is configured to inhibit movement of the wires 14A-14D out of the openings 80A-80D when the first and second housing portions 46, 50 are coupled together.

Figure 5:
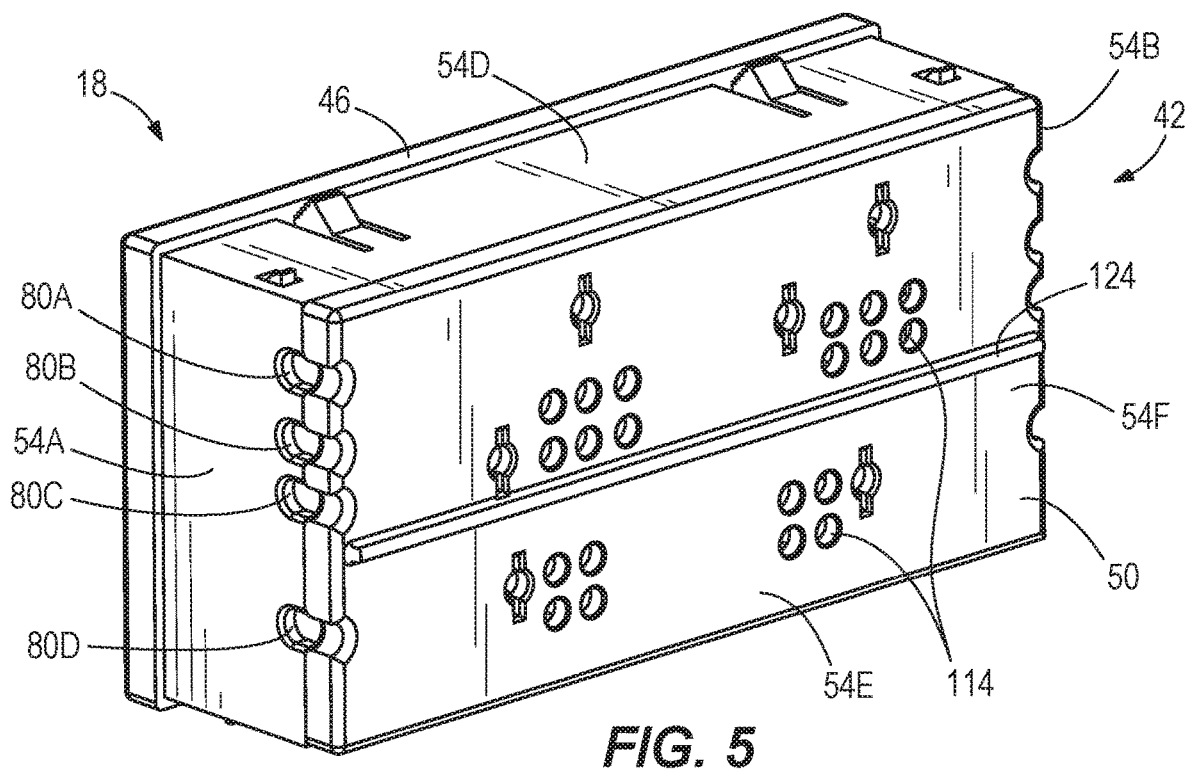
FIG. 5 is a rear perspective view of the power receptacle of FIG. 3.
Figure 8:
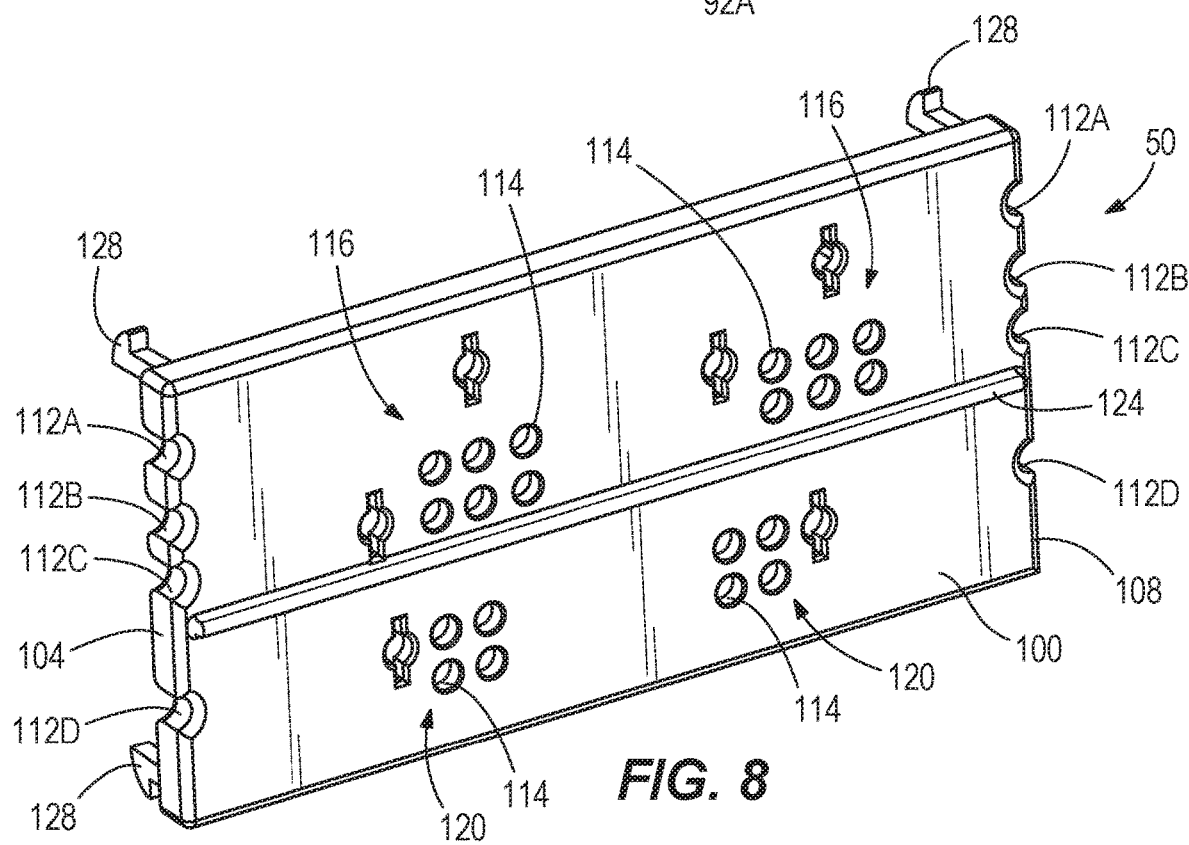
FIG. 8 is a rear perspective view of the second housing portion of FIG. 2.

With particular reference to FIGS. 5 and 8, the second housing portion 50 includes a plurality of holes 114 and a rib 124. The holes 114 extend from the surface 100 through the second housing portion 50 such that the holes 114 are in fluid communication with the first and second chambers 58, 62. In the illustrated embodiment, the holes 114 are positioned in groups. A first group of holes 116 (FIG. 8) is in fluid communication with the first chamber 58. A second group of holes 120 is in fluid communication with the second chamber 62. In addition, the first and second chambers 58, 62 each include two groups of holes 116, 120. As such, each power outlet 92A, 92B of the power receptacle 18 may include the first group of holes 116 and the second group of holes 120 separate from the holes 116, 120 of the other power outlet 92A, 92B. In other embodiments, the second housing portion 50 may include one or more holes 114. Still further in other embodiments, the holes 116 may be in fluid communication with one of the smaller chambers 70 of the first chamber 58 or the second chamber 62. The holes 114 are configured as drainage holes to drain liquid (e.g., water) that may enter the first and second chambers 58, 62.

Figure 6:
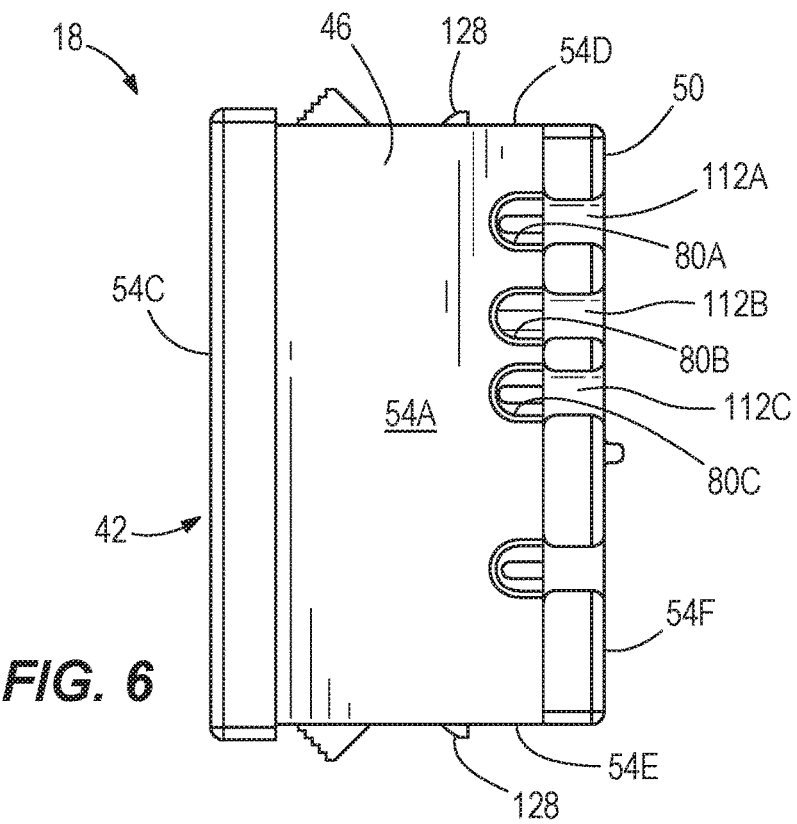
FIG. 6 is a side view of the power receptacle of FIG. 3.

With reference to FIGS. 5, 6, and 8, the rib 124 extends outwardly from the surface 100 and between the ends 104, 108 of the second housing portion 50. In the illustrated embodiment, the rib 124 separates the first group of holes 116 of the first chamber 58 from the second group of holes 120 of the second chamber 62. In other words, the rib 124 is configured to inhibit a liquid path forming between the first group of holes 116 and the second group of holes 120. As such, the rib 124 is configured to direct the liquid escaping from one of the first and second groups of holes 116, 120 away from the other of the first and second groups of holes 116, 120. In particular, the rib 124 is configured to break a surface tension of the liquid. In other embodiments, the power receptacle 18 may include one or more ribs 124 selectively positioned between the holes 114 and/or the groups of holes 116, 120. For example, in another embodiment, the power receptacle 18 may include a second rib (not shown) positioned between some of the holes 114 of the first group of holes 116 or the second group of holes 120 such that a liquid flow path forming between the smaller chambers 70 of the first or second chambers 58, 62, respectively, may be inhibited. Accordingly, the power receptacle 18 is configured as a spill resistant receptacle.

With reference to FIG. 8, the second housing portion 50 includes hook members 128. The hook members 128 are receivable within the holes 96 positioned on the top and bottom sides 54D, 54E of the first housing portion 46. In the illustrated embodiment, the second housing portion 50 includes four hook members 128, in which two hook members 128 are positioned proximate each end 104, 108 of the second housing portion 50. The hook members 128 are configured to releasably secure the second housing portion 50 to the first housing portion 46. As such, the first and second chambers 58, 62 are covered by the second housing portion 50 when the hook members 128 are received within the respective holes 96. In other embodiments, the power receptacle 18 may include other fastening means to secure the first and second housing portions 46, 50 together.

With reference to FIGS. 2, 9-10, 12A-12C, and 13, each power receptacle 18 includes the plurality of connection members 136A-136D. In the illustrated embodiment, the power receptacle 18 includes four connection members 136A-136D. The connection members 136A-136D correspond to the neutral, the first line, the second line, and the ground of the power distribution system 10. In other embodiments, the plurality of connection members 136A-136D may include three connection members: neutral, line, and ground. In particular, the connection members 136A-136D are formed by conductive material such as metal (e.g., copper).

Figure 16C:
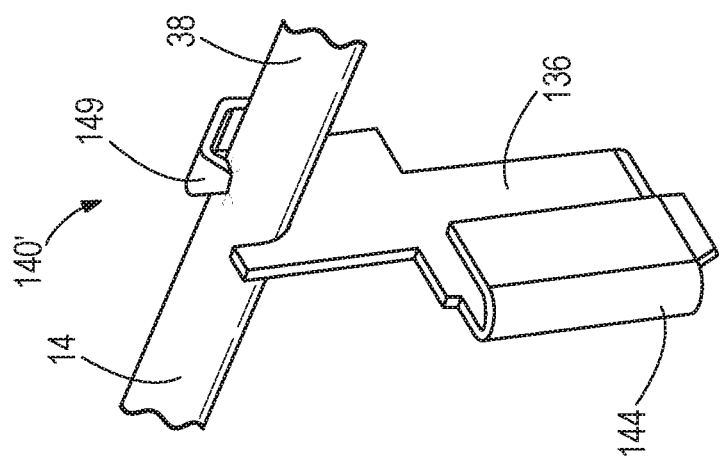
FIG. 16C is another perspective view of the one of the connection members and the wire of FIG. 16B, illustrating the one of the connection members in a second position.
Figure 16B:
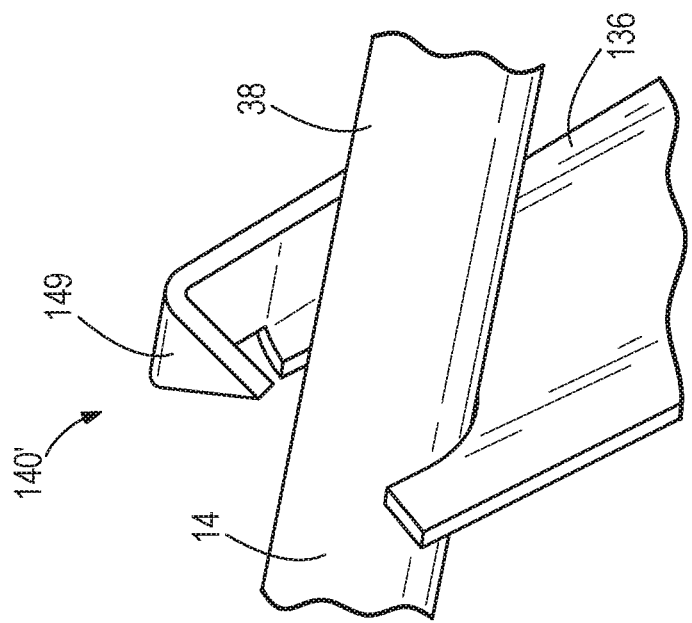
FIG. 16B is a perspective of the one of the connection members of FIG. 16A, and a wire, illustrating the one of the connection members in a first position.
Figure 16A:
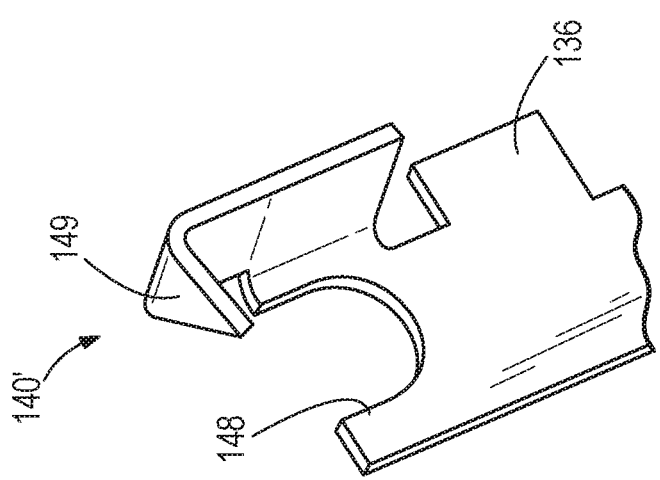
FIG. 16A is a perspective view of another alternative embodiment of one of the connection members of FIG. 12A.

With reference to FIGS. 12A-12C and 13, each connection member 136A-136D includes a first end 140 and a second end 144. The first end 140 is configured to contact the electrical conductor 40 within the insulation layer 38 of each respective wire 14A-14D. In some embodiments of the connection member 136A-136D (e.g., FIGS. 12A-12C), the first end 140 is configured as an insulation displacement connection (IDC) or insulation piercing connection (IPC) end 140. In the illustrated embodiment of the connection member 136A-136D, the first end 140 is configured to displace or pierce the insulation layer 38 of the respective wire 14A-14D when the wire 14A-14D is inserted through an opening 148 of the first end 140. In other embodiments of the connection member 136A-136D, as shown in FIGS. 16A-16C, the first end 140' includes a piercing portion 149 movable between a first position (FIG. 16B) and a second position (FIG. 16C). When the piercing portion 149 is in the first position, the first end 140' is not in contact with the electrical conductor 40 when the respective wire 14A-14D is inserted through the opening 148. When the piercing portion 149 is moved to the second position, the piercing portion 149 is configured to pierce the insulation layer 38 such that the first end 140' contacts the electrical conductor 40 within the insulation layer 38. Further, in other embodiments of the connection member 136A-136D as shown in FIGS. 15A-15C, a portion of the insulation layer 38 is removed from select locations on the respective wire 14A-14D (e.g., such as manually by a wire stripper, or automatically by a machine (e.g., Mechtrix MX-5050)) such that the first end 140" may contact the electrical conductor 40 when the respective wire 14A-14D is installed. In one example, as shown in FIGS. 15A-15C, the first end 140" includes a deformable portion 151 movable from a first position (FIG. 15B) to a second position (FIG. 15C) such that the deformable portion 151 is moved or bent about the exposed electrical conductor 40. Accordingly, each connection member 136A-136D is in electrical connection with the electrical conductor 40 within the insulation layer 38 of each respective wire 14A-114D. The plurality of connection members 136A-136D of the power receptacle 18 may include the same or different types of the first end 140, 140', 140" of the respective connection member 136A-136D for contacting any of the wires 14A-14D.

Figure 12A:
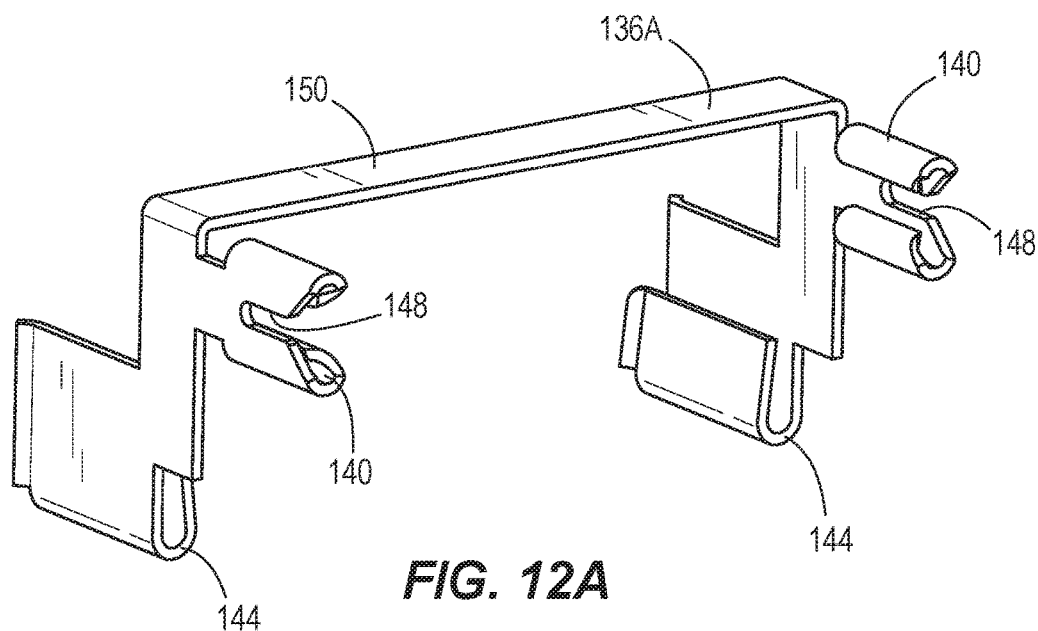
FIG. 12A is a perspective view of one of the connection members of FIG. 2.
Figure 12B:
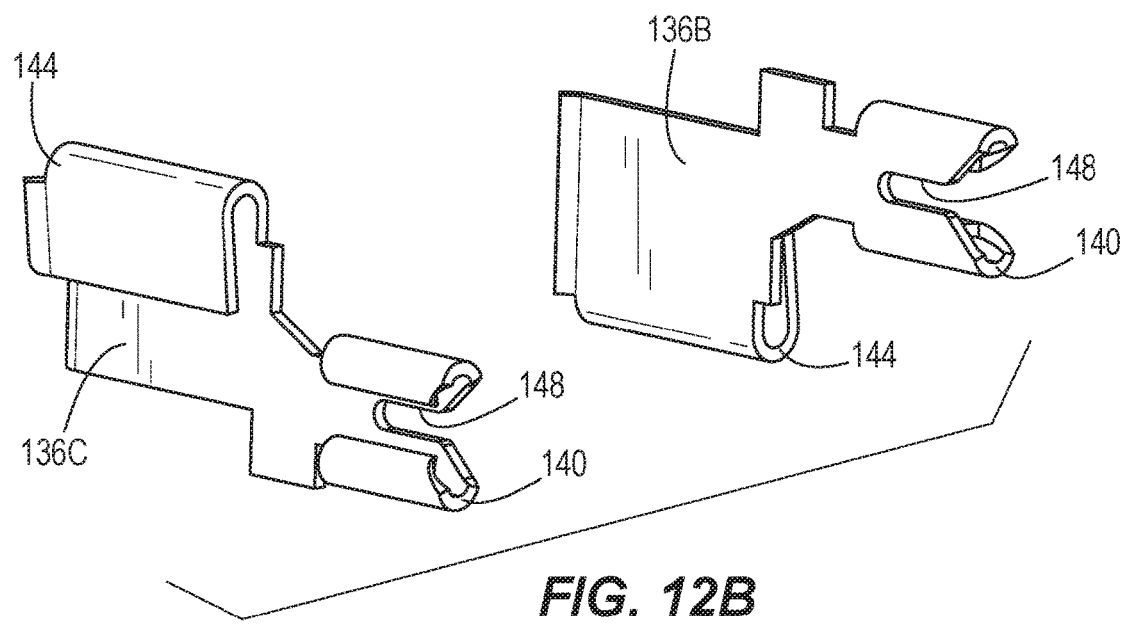
FIG. 12B is a perspective view of another two of the connection members of FIG. 2.
Figure 12C:
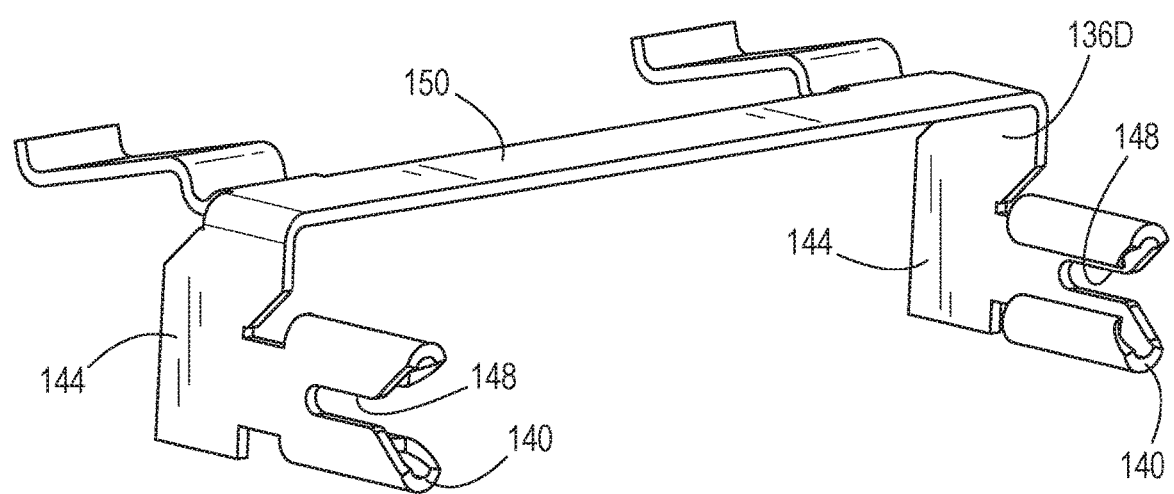
FIG. 12C is a perspective view of another one of the connection members of FIG. 2.

The second end 144 of each connection member 136A-136D opposite the first end 140 is configured as a terminal proximate a respective aperture 88A-88C of the first housing portion 46. For example, as shown in FIG. 12A, the first connection member 136A is the neutral connection member for connecting the neutral aperture 88A of both of the power outlets 92A, 92B with the neutral wire 14A. As shown in FIG. 12B, the second and third connection members 136B, 136C are the first line connection member and the second line connection member, respectively, for connecting the line aperture 88B of the first power outlet 92A to the first line wire 14B, and connecting the line aperture 88B of the second power outlet 92B to the second line wire 14C. As shown in FIG. 12C, the fourth connection member 136D is the ground connection member for connecting the ground aperture 88C of both of the power outlets 92A, 92B to the ground wire 14D. Furthermore, the neutral connection member 136A and the ground connection member 136D (FIG. 12C) each include two first ends 140 and two second ends 144 that are connected by an intermediate member 150. As such the ground and neutral terminals of the first and second power outlets 92A, 92B may be electrically connected. Alternatively, the second and third connection members 136B, 136C are separate such that the line terminals of the first and second power outlets 92A, 92B are not electrically connected to the same line wire 14B, 14C.

Figure 13:
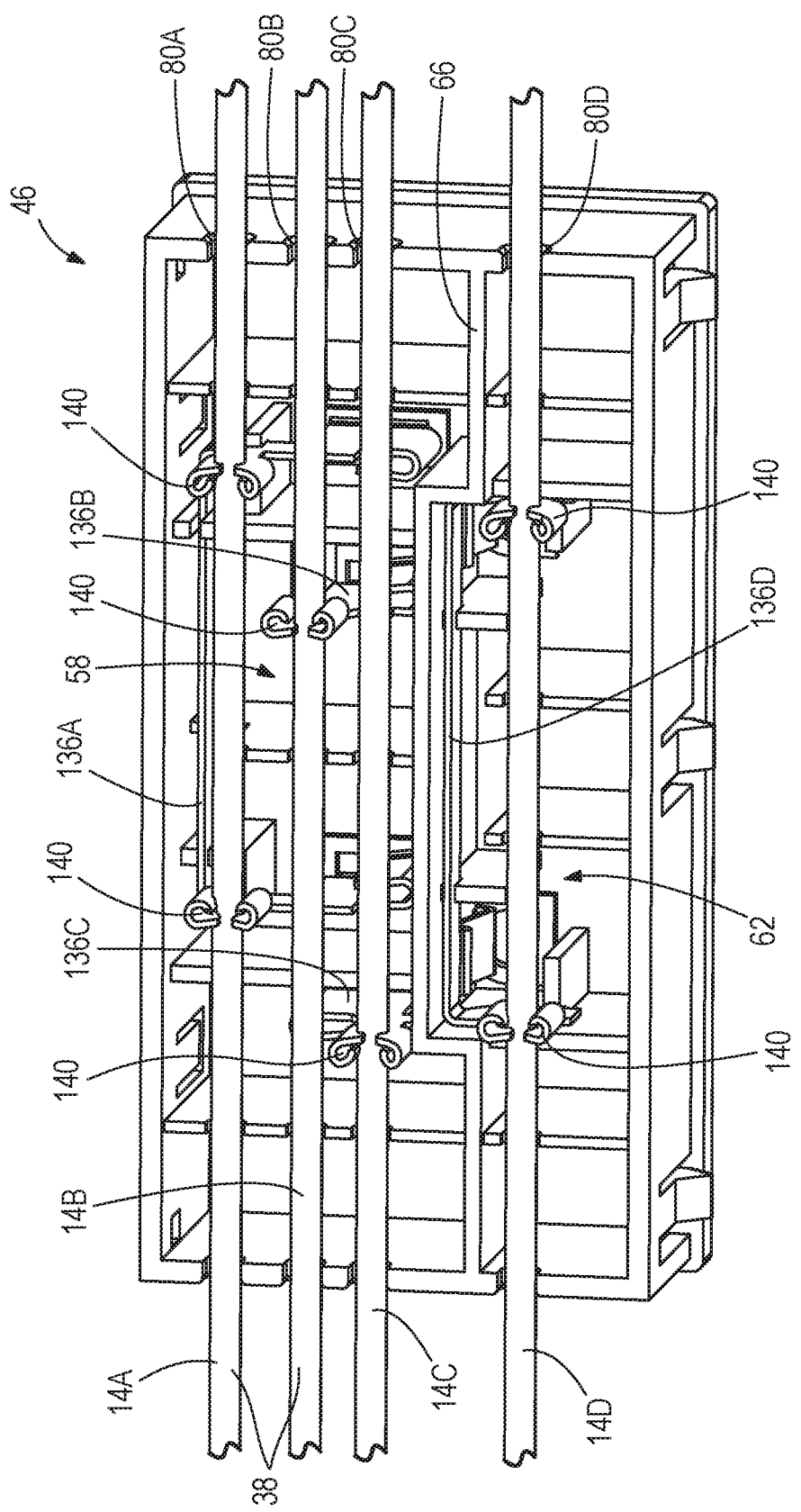
FIG. 13 is a rear perspective view of the first housing portion including the plurality of connection members of FIG. 2 and the plurality of wires of FIG. 1.

With reference to FIGS. 9-10 and 13, the first, second, and third (e.g., neutral, first line, and second line) connection members 136A-136C are positioned in the first chamber 58. In particular, the terminal ends 144 of the neutral connection member 136A are positioned proximate the neutral apertures 88A of the first and second power outlets 92A, 92B, respectively. The IDC ends 140 of the neutral connection member 136A are aligned with the first opening 80A of the first and second sides 54A, 54B of the housing 42. As such, the neutral wire 14A generally extends from the first opening 80A on the first side 54A, through the IDC ends 140 (i.e., the opening 148), to the first opening 80A of the second side 54B.

Similarly, the terminal end 144 of the first line connection member 136B is positioned proximate the line aperture 88B of the first power outlet 92A within the first chamber 58. The IDC end 140 of the first line connection member 136B is aligned with the second opening 80B of the first and second sides 54A, 54B. As such, the first line wire 14B generally extends from the second opening 80B on the first side 54A, through the IDC end 140 (i.e., the opening 148), to the second opening 80B of the second side 54B. The terminal end 144 of the second line connection member 136C is positioned proximate the line aperture 88B of the second power outlet 92B within the first chamber 58. The IDC end 140 of the second line connection member 136C is aligned with the third opening 80C of the first and second sides 54A, 54B. As such, the second line wire 14C generally extends from the third opening 80C on the first side 54A, through the IDC end 140 (i.e., the opening 148), to the third opening 80C of the second side 54B. Therefore, in the illustrated embodiment, the line aperture 88B of the first power outlet 92A is electrically connected to the first line wire 14B, and the line aperture 88B of the second power outlet 92B is electrically connected to the second line wire 14C.

The first line and second line connection members 136B, 136C are sized within the respective small chambers 70 such that the first line connection member 136B and the second line connection member 136C may be flipped (upside-down from the frame of reference of FIG. 10). Specifically, in this configuration, each terminal end 144 of the first and second line connection members 136B, 136C are always positioned proximate a line aperture 88B of one of the power outlets 92A, 92B, while the IDC end 140 (i.e., the opening 148) is aligned with one or the other of the second and third openings 80B, 80C. For example, if the first line connection member 136B is flipped, the IDC end 140 of the first line connection member 136B is aligned within the third opening 80C of the first and second sides 54A, 54B (i.e., instead of with the second opening 80B of the first and second sides 54A, 54B as shown in FIG. 10), and the IDC end 140 of the second line connection member 1360 is aligned within the second opening 80B of the first and second sides 54A, 54B (i.e., instead of with the third opening 80C of the first and second sides 54A, 54B as shown in FIG. 10). As such, the line aperture 88B of the first and second power outlets 92A, 92B may be electrically connected to either one of the first and second line wires 14B, 14C for positioning the power receptacle 18 in the desired orientation relative to the wires 14A-14D.

With continued reference to FIGS. 9-10 and 13, the fourth (i.e., ground) connection member 136D is positioned in the second chamber 62. In particular, the terminal ends 144 of the ground connection member 136D is positioned proximate the ground apertures 88C of the first and second power outlets 92A, 92B, respectively, within the second chamber 62. The IDC ends 140 of the ground connection member 136D are aligned with the fourth opening 80D of the first and second sides 54A, 54B of the housing 42. As such, the ground wire 14D generally extends from the fourth opening 80D on the first side 54A, through the DC ends 140 (i.e., the openings 148), to the fourth opening 80D on the second side 54B (FIG. 13).

The IDC ends 140 of the connection members 136A-136D are configured to electrically connect to the respective wires 14A-14D for allowing the power receptacles 18 to be positioned at any position along the length A of the wires 14A-14D without having to provide discrete electrical connection points along the wires 14A-14D. In other words, no crimping of the wires 14A-14D and/or additional connectors is needed at specific locations on the wires 14A-14D where power may be desired. As such, the number of parts needed for the power distribution system 10 may be reduced, while still providing power at the desired locations. Moreover, the IDC ends 140 of the connection members 136A-136D allow each power receptacle 18 to face any direction relative to the wires 14A-14D. For example, as shown in FIG. 1, some of the power receptacles 18 face in opposite directions.

With reference to FIG. 14, the power distribution system 10 is configured to be integrated into a furniture system 26, such as a table. In the illustrated embodiment, the power distribution system 26 is coupled to a tabletop 154 of the furniture system 26 to provide power receptacles at different locations on the tabletop 154. The wires 14A-14D connecting the receptacles may be housed within a trough or other suitable structure mounted beneath the tabletop 154. The power distribution system 10 allows the number and/or locations of the receptacles to be customized for different table (or other furniture) sizes, without having specific wiring harness sizes that are always set by a manufacturer. For example, a manufacturer can quickly assemble a customized power distribution system by simply cutting the wires to a desired length and clamping the desired number of receptacles onto the wires.

Although the invention has been described in detail with reference to certain preferred embodiments, variations and modifications exist within the scope and spirit of one or more independent aspects of the invention as described. Various features and advantages of the invention are set forth in the following claims.

What is claimed is:

1. A power distribution system comprising:
   a plurality of wires extending between a first end and a second end, the wires extending continuously between the first and second ends, each wire including an electrical conductor and an insulation layer;
   a receptacle selectively positionable at any position along a length of the wires, the power receptacle including a housing defining at least one power outlet;
   a plurality of connection members positioned within the housing, each connection member including a first end and a second end, the first end configured to contact the electrical conductors within the insulation layers of the plurality of wires for electrically connecting the plurality of connection members to the plurality of wires, and the second end configured as a terminal; and
   a wall member positioned within the housing to separate an interior of the housing into a first chamber portion and a second chamber portion,
   wherein a first connection member of the plurality of connection members is positioned within the first chamber portion, and
   wherein a second connection member of the plurality of connection members is positioned within the second chamber portion.

2. The power distribution system of claim 1, wherein the receptacle is selectively positionable at any orientation relative to the plurality of wires such that the receptacle is configured to face in any direction relative to the plurality of wires.

3. The power distribution system of claim 1, wherein the first end of at least one of the plurality of connection members includes an opening configured to receive one of the plurality of wires, and wherein the insulation is displaced when the one of the plurality of wires is inserted through the opening.

4. The power distribution system of claim 1, wherein the first end of at least one of the plurality of connection members includes an opening configured to receive one of the plurality of wires, and a piercing portion movable to pierce one of the plurality of wires after the one of the plurality of wires is received in the opening.

5. The power distribution system of claim 1, wherein the first end of at least one of the plurality of connection members includes a deformable portion that is bent about one of the plurality of wires.

6. The power distribution system of claim 1, wherein the at least one power outlet includes a plurality of apertures defined by the housing of the receptacle, and wherein the second end of each connection member is positioned proximate one of the plurality of apertures.

7. The power distribution system of claim 1, wherein the plurality of wires includes a first wire, a second wire, and a third wire, wherein the first wire is configured as a neutral wire, the second wire is configured as ground, and the third wire is configured as a first line.

8. The power distribution system of claim 7, wherein the at least one power outlet is a first power outlet, the receptacle further including a second power outlet, wherein the plurality of wires further includes a fourth wire configured as a second line, and wherein the third wire is configured to conduct the first line to the first power outlet, and the fourth wire is configured to conduct the second line to the second power outlet.

9. The power distribution system of claim 1, further comprising a wire connector positioned at one of the first end and the second end of the plurality of wires, the wire connector configured to electrically connect the power distribution system to another power distribution system.

10. The power distribution system of claim 9, wherein the wire connector is configured as a hermaphroditic connector.

11. The power distribution system of claim 1, wherein the at least one power outlet is positioned on a first side of the housing, wherein the receptacle includes a first hole and a second hole positioned on a second side opposite the first side, the first hole and the second hole in fluid communication with the first chamber portion and the second chamber portion, respectively, and wherein the receptacle further includes a rib extending outwardly from the second side of the housing, the rib positioned between the first hole and the second hole to inhibit a fluid flow path from forming between the first hole and the second hole.

12. A power receptacle comprising:
    a housing having a first side and a second side opposite the first side, the housing defining a power outlet on the first side, a first hole on the second side, and a second hole on the second side;
    a wall member positioned within the power receptacle to separate an interior of the housing into a first chamber portion and a second chamber portion, the first chamber portion having the first hole, and the second chamber portion having the second hole;
    a first connection member received in the first chamber portion and having an end configured as a terminal;
    a second connection member received in the second chamber portion and having an end configured as a terminal; and
    a rib extending outwardly from the second side of the housing, the rib positioned between the first hole and the second hole to inhibit a fluid path from forming between the first hole and the second hole.

13. The power receptacle of claim 12, wherein the first chamber portion is configured to receive a neutral wire, a line wire, or both, and the second chamber portion is configured to receive a ground wire, and wherein the first connection member is configured to electrically connect to the neutral wire or the line wire, and the second connection member is configured to electrically connect to the ground wire.

14. The power receptacle of claim 13, further comprising a third connection member positioned in a third chamber portion defined by an interior of the housing, the third chamber portion configured to receive the neutral wire or the line wire such that the neutral wire and the line wire are separated, and wherein the third connection member is configured to electrically connect to the neutral wire or the line wire that is received in the third chamber.

15. The power receptacle of claim 14, wherein the third chamber portion includes a third hole defined on the second side of the housing, wherein the rib is a first rib, the power receptacle further comprising a second rib extending outwardly from the second side of the housing, the second rib positioned between the first hole and the third hole to inhibit a fluid path from forming between the first hole and the third hole.

16. The power receptacle of claim 12, wherein the wall member is configured to inhibit a fluid flow path from forming between the first connection member and the second connection member.

17. The power receptacle of claim 12, wherein each of the first hole and the second hole is configured as a drainage hole to drain liquid from the first chamber portion and the second chamber portion, respectively, such that the first chamber portion and the second chamber portion do not fill up with the liquid.

18. A power distribution system comprising:
    a plurality of wires extending between a first end and a second end, the wires extending continuously between the first and second ends, each wire including an electrical conductor and an insulation layer;
    a receptacle selectively positionable at any position along a length of the wires, the power receptacle including
        a housing having a first side and a second side opposite the first side, the housing defining a power outlet on the first side, a first hole on the second side, and a second hole on the second side,
        a wall member positioned within the receptacle to separate an interior of the housing into a first chamber portion and a second chamber portion, the first chamber portion having the first hole, and the second chamber portion having the second hole,
        a first connection member received in the first chamber portion and having an end configured as a terminal,
        a second connection member received in the second chamber portion and having an end configured as a terminal, and
        a rib extending outwardly from the second side of the housing, the rib positioned between the first hole and the second hole to inhibit a fluid path from forming between the first hole and the second hole; and
    a plurality of connection members positioned within the housing, each connection member including a first end and a second end, the first end configured to contact the electrical conductors within the insulation layers of the plurality of wires for electrically connecting the plurality of connection members to the plurality of wires, and the second end configured as a terminal.

19. The power distribution system of claim 18, wherein the receptacle is selectively positionable at any orientation relative to the plurality of wires such that the receptacle is configured to face in any direction relative to the plurality of wires.

20. The power distribution system of claim 18, further comprising a wire connector positioned at one of the first end and the second end of the plurality of wires, the wire connector configured to electrically connect the power distribution system to another power distribution system.

* * * * *